(No Model.) 3 Sheets—Sheet 1.
O. WIDERBORG & A. G. GARFIELD.
BICYCLE.
No. 509,986. Patented Dec. 5, 1893.
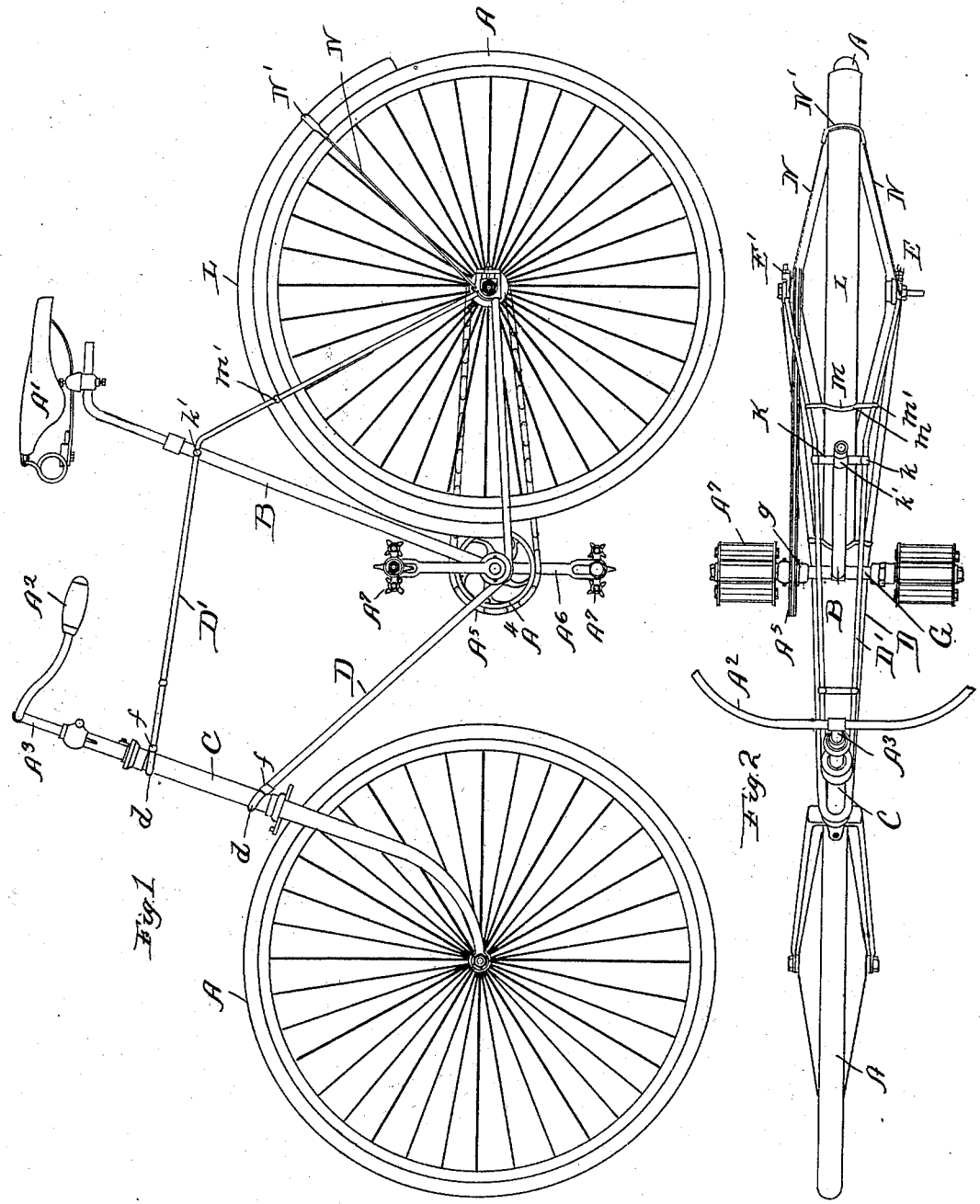

(No Model.) 3 Sheets—Sheet 2.
O. WIDERBORG & A. G. GARFIELD.
BICYCLE.
No. 509,986. Patented Dec. 5, 1893.
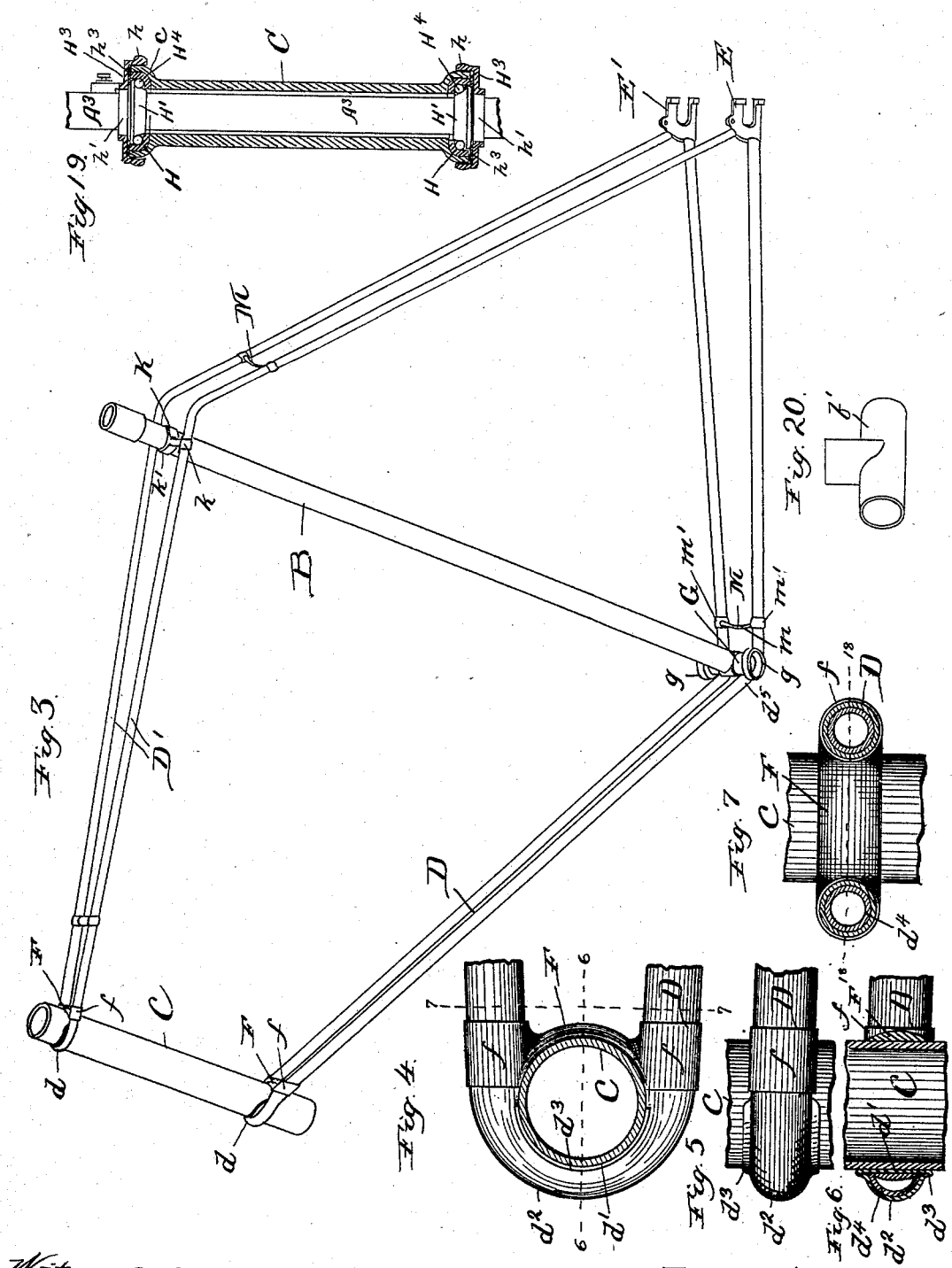
Witnesses:
Lew. E. Curtis
H. W. Munday
Inventors:
Albert G. Garfield
Olof Widerborg
By Munday, Evarts & Adcock
their Attorneys.
THE NATIONAL LITHOGRAPHING COMPANY,
WASHINGTON, D. C.

(No Model.) 3 Sheets—Sheet 3.
O. WIDERBORG & A. G. GARFIELD.
BICYCLE.
No. 509,986. Patented Dec. 5, 1893.
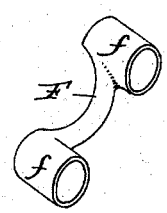
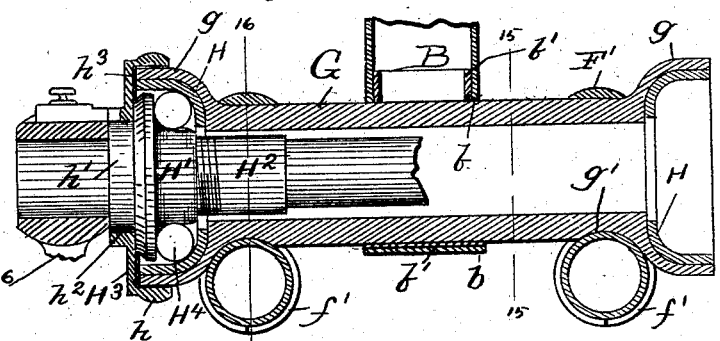
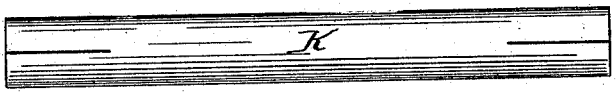
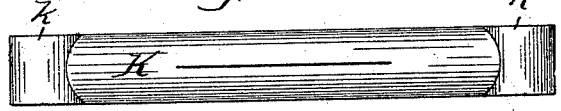
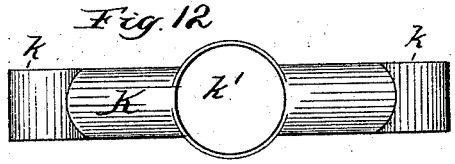
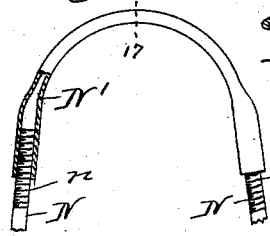

UNITED STATES PATENT OFFICE.

OLOF WIDERBORG AND ALBERT G. GARFIELD, OF CHICAGO, ILLINOIS, ASSIGNORS, BY MESNE ASSIGNMENTS, TO SAID GARFIELD.

BICYCLE.

SPECIFICATION forming part of Letters Patent No. 509,986, dated December 5, 1893.

Application filed April 8, 1892. Serial No. 428,262. (No model.)

*To all whom it may concern:*

Be it known that we, OLOF WIDERBORG and ALBERT G. GARFIELD, citizens of the United States, residing in Chicago, in the county of Cook and State of Illinois, have invented a new and useful Improvement in Bicycles, of which the following is a specification.

Our invention relates to improvements in bicycles, and more particularly to improvements in the construction of the bicycle frame.

The principal object of our invention is to provide a bicycle frame which will at once combine or unite in itself great strength and rigidity with lightness of weight, symmetry of outline and design, and at the same time be of a simple and durable construction and as free as possible from joints and connections that are liable to work loose and tend to unnecessarily increase the weight of the machine, as well as to add to its cost of construction.

Our invention consists in the means which we have employed to accomplish this object or result; that is to say, our improved frame comprises in connection with the head and seat post and the crank axle hub, two seamless and continuous or unbroken steel tubes, each extending from the rear wheel to the head tube around which they are folded at their middle and to which they are brazed. At the point where these continuous seamless frame tubes are folded around the head they are flattened, or half flattened, that is to say upon their inner sides, to conform to the cylindrical surface of the head tube and thus form a broad surface for the brazed joint. At this point or fold also, we reinforce or further strengthen the folded frame tube by a short strengthening tube or bar which is preferably placed inside the continuous tube at the middle thereof before the same is bent or folded. To form a continuous socket around the head tube at the point where the folded frame tube is united thereto, we provide a segmental socket forging, preferably of steel, and furnished with eyes or sleeves through which the two limbs or folds of the frame tubes pass. This double sleeved segmental forging when brazed in position to the head tube and to the frame tubes thus serves not only to complete the socket for the head tube and to form a neater, stronger and more rigid union therewith; but the sleeves or eyes of this forging also serve to materially strengthen the two arms of the folded frame tubes at their point of union with the head tube and to firmly and rigidly combine the same together. The crank axle hub is combined or united with the lower folded frame tube at its obtuse angle or bend, such bend forming a cradle in which the crank axle hub fits, the latter being provided with notches or saddles conforming to the curvature and bend of the frame tube. The bells or enlarged sockets, formed on the end of the crank axle hub to receive the ball bearing shell, also serve, in this combination of the crank axle hub with the continuous frame tube, to increase the surface of contact or brazing surface between the frame tube and the crank axle hub and thus materially increase the strength and rigidity of the joint or union between the two; while at the same time these bells or socket enlargements act also as shoulders or braces to hold the frame tubes in place. In this combination of the continuous frame tube with the crank axle hub, we also use or may use the additional element of a double sleeved segmental forging which embraces or surrounds the crank axle hub and thus forms a complete socket therefor.

Our invention also consists in the novel devices and novel combinations of parts and devices herein shown and described and more particularly pointed out in the claims.

In the accompanying drawings, which form a part of this specification, and in which similar letters of reference indicate like parts throughout all the figures, Figure 1 is a side elevation of one form of bicycle embodying our invention, the same showing what we believe to be the best mode of construction now known to us for practicing the same. Fig. 2 is a plan view. Fig. 3 is an enlarged detail perspective view of the frame. Fig. 4 is a still further enlarged detail view showing the head tube in section and one of the folded frame tubes in plan. Fig. 5 is a side view of Fig. 4. Fig. 6 is a section on line 6—6 of Fig. 4. Fig. 7 is a section on line 7—7 of Fig. 4. Fig. 8 is a detail perspective view of the segmental socket which partially encircles the head tube. Fig. 9 is an enlarged detail side view of the tube out of which the cross brace uniting the seat post to the upper folded frame tube is formed. Fig. 10 is a similar view after the sleeves, eyes or sockets have been formed in the ends of said tube. Fig. 11 is a plan view of said tube before the seat post socket is formed therein; and Fig. 12 is a plan view of this tube after such seat post socket is formed. Fig. 13 is a detail view partly in section of the mud guard supporting strap. Fig. 14 is a detail sectional view centrally through the crank axle hub and seat post. Figs. 15 and 16 are sections on lines 15—15 and 16—16 of Fig. 14. Fig. 17 is a cross section on line 17—17 of Fig. 13. Fig. 18 is a partial section on line 18—18 of Fig. 7. Fig. 19 is a sectional view through the head tube; and Fig. 20 is a detail view of the seat post coupling.

In the drawings A represents the wheels, A' the seat, $A^2$ the handles, $A^3$ the steering shaft or head, $A^4$ the driving wheel, $A^5$ the chain, $A^6$ the crank arms and $A^7$ the treadles, all of which parts are or may be of any well known or suitable construction.

B is the seat post, and C the head tube, both being in the form of seamless steel tubes.

D and D' are the lower and upper seamless continuous frame tubes each having a fold $d$ at its middle around the head tube C and extending from one side of the rear wheel around the head tube back to the other side of said rear wheel, the two ends of each of said frame tubes being secured to the chain adjustment forgings E and E'. Each of the continuous seamless steel frame tubes D and D' at its fold $d$ is also furnished with a flattened inner wall $d'$ fitting upon and conforming to the cylindrical surface of the head tube C around which it is formed. The outer wall or half $d^2$ of each of the tubes D D' at this fold $d$ is left preferably of its natural or curved or cylindrical outline, as the natural strength of the tube is thereby better preserved.

The operation of flattening or pressing out into a plane surface the inner wall $d'$ of the tube forms also folds or flanges $d^3$ at each edge of the tube at this fold $d$, which thus increases the width or brazing surface between the frame tubes D D' and the head tube C. To further strengthen the frame tubes D D' at or near their point of union with the head tube C, we also as a further improvement insert a supplemental tube or strengthening bar $d^4$ at the middle of the tubes D D' before the same are flattened or folded to form the socket for the head tube. To further strengthen the union or joint between the folded frame tubes and the head tube we combine therewith a segmental socket forging F preferably made of steel and furnished with two eyes or sleeves $ff$ which embrace the two limbs or arms of the folded frame tubes. The segmental socket F completes the circle of the segmental socket $d$ formed by the fold of the frame tubes around the tube C. The eyes or sleeves $f$ of the segmental socket F are preferably both seamless, the two arms of the folded frame tube being inserted through the same after the tube is folded and the flattened partial socket $d$ formed therein, or thereon. The reinforcing bar $d^4$ at the fold $d$ is preferably made in the form of a tube snugly fitting the interior of the frame tubes D D'; and the operation of flattening the inner wall of the frame tube will also serve to flatten and upset the inner wall of this supplemental or strengthening tube $d^4$ as is clearly indicated in Fig. 6. By making the supplemental bar in the form of a hollow tube we secure greater strength with the same weight of metal and the subsequent operation of flattening the tube serves to produce a very close and intimate union between the outer and inner tubes. As the socket or bend $d$ in the frame tubes D D' and the flattening of the inner wall of said tubes is ordinarily performed when the tubes are hot, the operation serves in a measure to weld the inner and outer tubes together. The lower folded continuous frame tube D is furnished with an obtuse angle or bend $d^5$ to form a seat for the crank axle hub G to rest upon. The frame tube D however is simply bent, but in no way cut or mutilated so as to weaken the same. The crank axle hub G is furnished with an enlarged end or bell $g$ to receive the cup or shell H of the ball bearing. The crank axle hub G is made of a seamless steel tube, the sockets or enlargements being formed by pressing or swaging the seamless tube at its ends. The seamless-tube hub G is further provided with curved angular saddles $g'$, the curvature of said saddles conforming to the curvature of the frame tube D and the angle of said saddles conforming to the angle or bend $d^5$ in the tubes D at the point where the hub G rests thereon. The bells or enlargements $g$ at the ends of the hub G also constitute continuations of the curved saddles $g'$, and serve in connection with said saddles as braces or shoulders to hold the frame tube in position or its two limbs in proper relation to each other and to the hub tube G. By means of the angles or bends $d^5$ in the two limbs of the frame tube D and of the co-operating curved angular saddle or seat $g'$ formed on the crank axle hub G, a wide or extended brazing surface is formed between the hub G and frame tube D, so that the parts may be securely united together; while at the same time the frame tube D is in no way cut or weakened and the full strength of the tube is also fully utilized as the crank axle hub rests above or on top of the same. However to further strengthen the frame tube D at this point, as a further improvement, we combine with the frame tube and the crank axle hub a segmental socket F', similar to the segmental socket F, and also preferably furnished with eyes or sleeves $f'$ surrounding the frame tube D, one on each side of the crank axle hub G, as is clearly indicated in Fig. 16. One of the eyes $f'$ is split, as indicated in Fig. 14 to facilitate the putting of the parts together in the construction of the device.

The seamless steel seat post tube B is furnished with a socket $b$ at its lower end embracing or partially embracing the crank axle hub G, said socket being formed of the tube itself by cutting the same at its lower end to the necessary shape. A tubular T-coupling $b'$ which is slipped over the hub tube G before both the bells $g$ are formed thereon, securely connects the seat post tube B and the hub tube G.

The same construction as illustrated in Figs. 9 and 10 in relation to cross brace tube K may also be employed if desired for coupling or securing the seat post B to the hub G, either with or without the T-coupling $b'$, but in the latter case such T-coupling should be split or made to only partially encircle the hub G. The tube K is furnished with sockets $k$, one at each end, to receive the two limbs of the upper frame tube D', the same being formed integral with the seamless steel tube K itself by splitting and flattening the ends of said tube and swaging or pressing such split and flattened ends into the form of sockets, as is clearly illustrated in Figs. 9 and 10. The tube K is further furnished with an integral socket $k'$ at its middle formed by splitting the tube at this point and flattening and bending the two split halves of the tube into the form of a socket, the operation being illustrated in Figs. 11 and 12. The seamless cross tube K, is furnished with integral sockets at its middle and ends to receive the seat post and the two limbs of the upper frame tube D', thus make a simple, light and very strong means of combining the seat post at its upper end with the frame tube. The frame tubes D D' on each side of the rear wheel are united together by the forgings E E' of the chain adjustment, said forgings being provided with the usual shanks or studs to which the frame tubes are united in the ordinary manner.

The mud guard L of the rear wheel is of the ordinary construction and is attached at its front end to a cross brace tube M having a flattened and curved middle portion $m$ and two eyes or sleeves $m'$ embracing the two limbs of the lower frame tube D. The upper frame tube D' is furnished with a similar cross brace M. The rear end of the mud guard L is connected by supporting rods N with the chain adjustment forgings E E', said rods N having screw threads $n$ at their outer ends by which said rods are secured to the threaded tube N' which is flattened and curved to conform to the mud guard around which it passes and to which it is secured.

The cup or shell part H of the ball bearing fits in and is rigidly secured to the bell or enlarged end $g$ of the hub. The cone part H' of the ball bearing is secured by screw threads to the axle $H^2$ and is furnished with a separate cap $H^3$ having a flange $h$ which fits over the bell $g$. The hub or tubular extension $h'$ of the cone H' extends through a flange hole or opening $h^2$ in the cap $H^3$, the cap and cone being here soldered or otherwise secured together to prevent any possibility of dust entering, and a dust excluding packing $h^3$ is inserted between the cap $H^3$ and the rim or edge of the shell H and bell $g$, so as to perfectly exclude dust from the ball bearing.

$H^4$ represents the balls of the ball bearing.

The head tube C is, as stated before, a seamless steel tube and it is preferably furnished with enlargements or bells $c$ at its ends to form sockets to receive the ball bearing shell H of the ball bearing by which the head or steering shaft $A^3$ is journaled. The ball bearings at each end of the head tube C are of substantially the same construction as that hereinbefore described in relation to the crank axle. The socket $b$ on the seat post B at the lower end thereof and which surrounds the crank axle hub or tube G is or may be formed integral with the seat post tube B by splitting the same and flattening and curving the split parts of the tube into a cylindrical form to embrace the tube G, as is clearly indicated in Fig. 15. The socket $b$ thus formed is similar in construction to the socket $k$ on the end of the tube K shown in Figs. 10 and 11 in connection with Fig. 9 indicating the manner of forming the socket $k$.

We claim—

1. The bicycle frame consisting of a head tube and upper and lower continuous seamless frame tubes extending from the rear wheel and folded around and secured to the head tube at their middle, each of said frame tubes having a curved or rounded outer wall and a flattened inner wall $d'$ at its fold $d$ around said tube, and a segmental socket F to complete the socket around the head tube, substantially as specified.

2. The bicycle frame consisting of a head tube and upper and lower continuous seamless frame tubes extending from the rear wheel and folded around and secured to the head tube at their middle, each of said frame tubes having a flattened inner wall $d'$ at its fold $d$ around said head tube, and a segmental socket F to complete the socket around the head tube, said segmental socket being provided with eyes or sleeves embracing the two branches or limbs of said frame tube, substantially as specified.

3. The bicycle frame consisting of a head tube and upper and lower continuous seamless frame tubes extending from the rear wheel and folded around and secured to the head tube at their middle, each of said frame tubes having a flattened inner wall $d'$ at its fold $d$ around said head tube, and a segmental socket F to complete the socket around the head tube, said segmental socket being provided with eyes or sleeves embracing the two branches or limbs of said frame tube, and a short reinforcing tubular bar to strengthen said frame tubes at the bend $d$ therein, substantially as specified.

4. In a bicycle frame the combination with a head tube of a tube folded around said head tube having a flattened inner wall brazed thereto, and a segmental socket embracing said head tube and secured at its ends to the two limbs of said folded tube, substantially as specified.

5. In a bicycle frame the combination with a head tube of a tube folded around said head tube having a flattened inner wall brazed thereto, and a segmental socket embracing said head tube and furnished with eyes or sleeves surrounding the two limbs or branches of said folded tube, substantially as specified.

6. The combination with a crank axle hub having enlargements or bells at its ends to receive the ball bearing shell, of frame tubes extending continuously under said hub and upon which said hub rests and is secured, the bells at the ends of said hubs fitting against said frame tubes and serving as shoulders, substantially as specified.

7. The combination of a continuous seamless steel frame tube D folded at its middle around the head and having two limbs or branches furnished each with a bend or angle, of a seamless pressed crank axle hub G having enlargements or bells $g$ at its ends and resting upon and secured to said frame tube D at the bends or angles thereof, said bells $g\ g$ fitting against the branches of said frame tube at said bends or angles therein and serving as shoulders and a segmental socket F' having eyes $f'$ embracing the branches of said frame tubes, substantially as specified.

8. The combination of a continuous seamless steel frame tube D folded at its middle around the head, of a seamless pressed crank axle hub G having enlargements or bells $g$ at its ends and resting upon and secured to said frame D at the bend or angle thereof, said hub having curved angular seats $g'$ for the two branches of said folded tube D, said bells $g\ g$ fitting against the frame tube and serving as shoulders and a segmental socket having eyes embracing the branches of said frame tubes, substantially as specified.

9. The combination, with tube B of hub tube G having bells or enlargements $g$ at its ends and a socket $b$ integral with said tube B, substantially as specified.

10. The bicycle frame comprising the following parts united and combined together:—a seamless head tube C, furnished with bells or enlargements $c$ at its ends to receive the ball bearing shells, the post B having integral socket $b$ at its lower end, crank axle hub G having bells or enlargements $g$ at its ends to receive the ball bearing shells, and continuous seamless folded frame tubes D D' having each a fold $d$ extending around and secured to said head tube C, and chain adjustment forgings E E' to which the ends of said tubes D D' are secured, the fold $d$ in said frame tubes having flattened inner wall $d'$, reinforcing tubes $d^4$, segmental sockets F furnished with sleeves $f$, substantially as specified.

11. The combination with crank axle hub G, of a frame tube extending continuously under said hub and upon which said hub rests and to which it is secured, and a segmental socket F' embracing said hub and secured at its ends to said frame tube, substantially as specified.

12. The combination with crank axle hub G, of a frame tube extending continuously under said hub and upon which said hub rests and to which it is secured, and a segmental socket F' embracing said hub and secured at its ends to said frame tube, said segmental socket F' having sleeves $f'$ surrounding said frame tube, substantially as specified.

13. The bicycle frame comprising the following parts united and combined together:—seat post tube B, crank axle hub G, head C, forgings E E', and upper and lower continuous seamless folded frame tubes D D' extending from said forgings E E' around said head tube C, and segmental sockets F, substantially as specified.

OLOF WIDERBORG.
ALBERT G. GARFIELD.

Witnesses:
H. M. MUNDAY,
EMMA HACK.